US010055609B2

(12) United States Patent
Brands

(10) Patent No.: US 10,055,609 B2
(45) Date of Patent: Aug. 21, 2018

(54) NFC-BASED AUTHORIZATION OF ACCESS TO DATA FROM A THIRD PARTY DEVICE

(71) Applicant: NXP B.V., Eindhoven (NL)

(72) Inventor: Jan René Brands, Eindhoven (NL)

(73) Assignee: NXP B.V., Eindhoven (NL)

( * ) Notice: Subject to any disclaimer, the term of this patent is extended or adjusted under 35 U.S.C. 154(b) by 16 days.

(21) Appl. No.: 14/669,829

(22) Filed: Mar. 26, 2015

(65) Prior Publication Data

US 2015/0278548 A1  Oct. 1, 2015

(30) Foreign Application Priority Data

Mar. 28, 2014 (EP) .................................. 14162486

(51) Int. Cl.
| | | |
|---|---|---|
| *G06F 21/62* | (2013.01) | |
| *H04L 29/06* | (2006.01) | |
| *H04W 12/08* | (2009.01) | |
| *H04W 4/80* | (2018.01) | |
| *H04L 29/08* | (2006.01) | |

(52) U.S. Cl.
CPC .......... *G06F 21/6245* (2013.01); *H04L 63/08* (2013.01); *H04L 63/0807* (2013.01); *H04L 63/0853* (2013.01); *H04L 63/10* (2013.01); *H04W 4/80* (2018.02); *H04W 12/08* (2013.01); *H04L 67/02* (2013.01)

(58) Field of Classification Search
CPC . G06F 21/6245; H04L 63/08; H04L 63/0807; H04L 63/0853; H04L 67/02; H04W 4/008
See application file for complete search history.

(56) References Cited

U.S. PATENT DOCUMENTS

| | | | | |
|---|---|---|---|---|
| 6,314,425 B1 * | 11/2001 | Serbinis | .............. | G06F 17/3089 |
| 7,676,835 B2 * | 3/2010 | Brannon | ............. | G06F 21/6218 |
| | | | | 726/10 |

(Continued)

FOREIGN PATENT DOCUMENTS

| | | |
|---|---|---|
| WO | WO-2011103916 A1 | 9/2011 |
| WO | WO-2012069263 A2 | 5/2012 |
| WO | WO-2012107058 A1 | 8/2012 |

OTHER PUBLICATIONS

European Search Report for European Patent Application 14162486 dated Sep. 17, 2014.

(Continued)

*Primary Examiner* — Saleh Najjar
*Assistant Examiner* — Louis C Teng

(57) ABSTRACT

A third party device is authorized to access data associated with a user account at a service provider, wherein the third party device and a user device are in data communication with the service provider, and are both NFC-enabled. The method comprises obtaining a request token generated by the service provider, transmitting the request token from the third party device to the user device via NFC, authorizing the request token at the user device, transmitting the authorized request token from the user device to the third party device via NFC, and obtaining an access token generated by the service provider, corresponding to the authorized request token, wherein the access token allows the third party device to access data associated with the user account at the service provider.

14 Claims, 1 Drawing Sheet

(56) References Cited

U.S. PATENT DOCUMENTS

| | | | | |
|---|---|---|---|---|
| 8,650,622 B2* | 2/2014 | Murakami | | H04W 12/08 |
| | | | | 705/26.1 |
| 8,819,784 B2* | 8/2014 | Monjas Llorente | .. | H04L 63/105 |
| | | | | 726/3 |
| 9,256,722 B2* | 2/2016 | Saxman | | G06F 21/33 |
| 2006/0080546 A1* | 4/2006 | Brannon | | G06F 21/6218 |
| | | | | 713/185 |
| 2010/0144314 A1* | 6/2010 | Sherkin | | G06F 21/33 |
| | | | | 455/411 |
| 2012/0144202 A1* | 6/2012 | Counterman | | G06F 21/335 |
| | | | | 713/176 |
| 2012/0317624 A1* | 12/2012 | Monjas Llorente | .. | H04L 63/105 |
| | | | | 726/4 |
| 2013/0007846 A1 | 1/2013 | Murakami | | |
| 2013/0047216 A1* | 2/2013 | Ajitomi | | G06F 9/541 |
| | | | | 726/4 |
| 2013/0227707 A1* | 8/2013 | Gay | | H04L 63/0421 |
| | | | | 726/27 |
| 2014/0026193 A1* | 1/2014 | Saxman | | G06F 21/33 |
| | | | | 726/4 |
| 2014/0068746 A1* | 3/2014 | Gonzalez Martinez | | H04L 63/0884 |
| | | | | 726/9 |
| 2014/0230023 A1* | 8/2014 | Parks | | G06F 21/41 |
| | | | | 726/4 |
| 2015/0237044 A1* | 8/2015 | Gupta | | H04L 63/0853 |
| | | | | 726/9 |
| 2015/0249540 A1* | 9/2015 | Khalil | | H04L 63/0853 |
| | | | | 713/158 |
| 2016/0087966 A1* | 3/2016 | Saxman | | G06F 21/33 |
| | | | | 726/4 |

OTHER PUBLICATIONS

Hardt, D et al., The OAuth 2.0 Authorization Framework; Internet engineering task force, IETF; Standardworking Draft, Internet Society (ISOC) 4, Geneva Switzerland, Oct. 2012, pp. 1-77.

* cited by examiner

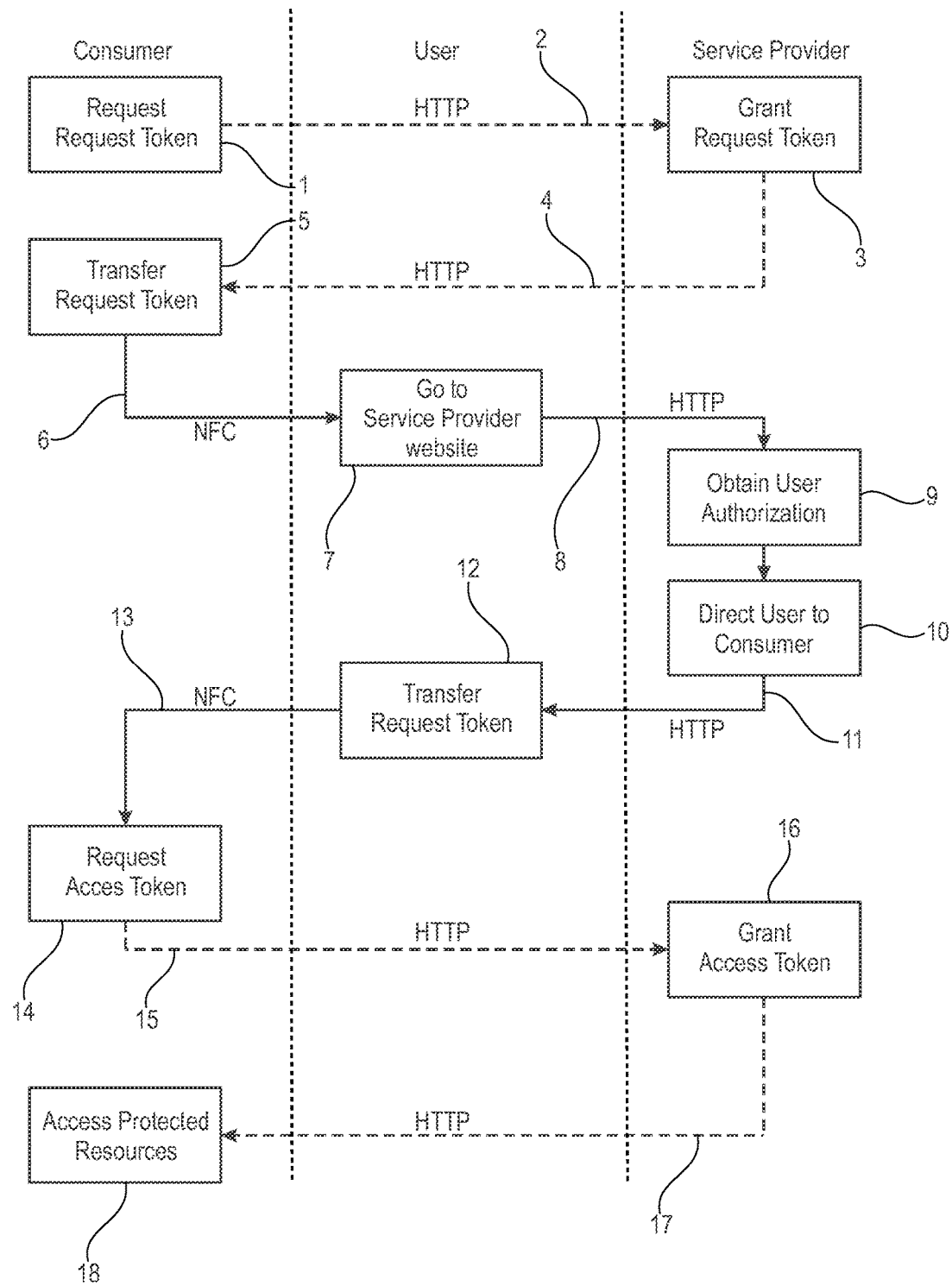

NFC-BASED AUTHORIZATION OF ACCESS TO DATA FROM A THIRD PARTY DEVICE

CROSS-REFERENCE TO RELATED APPLICATIONS

This application claims the priority under 35 U.S.C. § 119 of European patent application no. 14162486.6, filed on Mar. 28, 2014, the contents of which are incorporated by reference herein.

FIELD OF THE INVENTION

The present invention relates to the field of authorizing access to services, in particular to methods and systems for authorizing a third party device to access data associated with a user account at a service provider.

ART BACKGROUND

Numerous different web services exists that may be used for communication and content creation, storage and sharing. Various electronic devices, such as mobile phones, tables, set-top boxes and game consoles, allow users to enter and store their credentials (i.e. user ID and password) in order to access and use such web services.

In some cases, however, a user may want to access a web service from a device that does not belong to the user, or the user may want to allow someone else (a third party) to access the web service from a device owned by the third party. One example is the case where a user would like to show photos stored at an online service on a TV or similar device at a friend's home.

In such cases, it may not be desirable for the user that his credentials are entered through a device that does not belong to him, as the device (or software running on the device) may store the credentials and thereby allow continued access to the user's web service account. Furthermore, it may be desirable for the user to only provide access to a selection of content or data from his web service (e.g. recent holiday photos) while keeping other content or data (e.g. work related data) private.

There may thus be a need for a way of authorizing a third party device to access data associated with a user account without the above described drawbacks associated with disclosure of user credentials.

SUMMARY OF THE INVENTION

This need may be met by the subject matter according to the independent claims. Advantageous embodiments of the present invention are set forth in the dependent claims.

According to a first aspect there is provided a method of authorizing a third party device to access data associated with a user account at a service provider, wherein the third party device and a user device are in data communication with the service provider, and wherein the third party device and the user device are both NFC-enabled. The method comprises (a) obtaining a request token generated by the service provider, (b) transmitting the request token from the third party device to the user device via NFC, (c) authorizing the request token at the user device, (d) transmitting the authorized request token from the user device to the third party device via NFC, and (e) obtaining an access token generated by the service provider, the access token corresponding to the authorized request token, wherein the access token allows the third party device to access data associated with the user account at the service provider.

This aspect is based on the idea that the process of allowing a third party device (consumer) to access data belonging to a user's account at a service provider is handed over to a user device (i.e. a device belonging to the user who owns the user account at the service provider) via NFC. By handing over the authorization process to the user device, there is no need to input user credentials (such as user ID and password) at the third party device. Accordingly, the privacy of the user credentials is maintained.

More specifically, the authorization process is handed over to the user device by transferring a request token (i.e. a particular piece of data obtained from the service provider, which indicates that the third party device requests access to the user account) from the third party device to the user device via NFC. To do this, the user positions the user device in close proximity of the third party device in order to enable the NFC data transfer. Then, the request token is authorized at the user device (i.e. the request token is modified to indicate that the user allows access). After completing the authorization of the request token, the authorized request token is transferred back to the third party device via NFC. Again, the NFC data transfer is performed by positioning the user device in close proximity of the third party device. Upon receiving the authorized request token, the third party device may now obtain a corresponding access token from the service provider, i.e. a piece of data which allows the third party device to access the desired data at the service provider. More specifically, by submitting the access token to the service provider, the service provider will, upon verification of the access token, allow the third party device to access the data belonging to the user who owns the user account and the user device.

According to an embodiment, the step of obtaining a request token comprises (a) transmitting a request for a request token from the third party device to the service provider, (b) generating a request token at the service provider in response to the request, (c) transmitting the generated request token from the service provider to the third party device, and (d) receiving the generated request token at the third party device.

The third party device and the service provider are in data communication, e.g. via the Internet. The third party device transmits a request for a request token to the service provider. This transmission may be initiated (by the user or the third party) in various ways, e.g. by going to the service provider website and activating a corresponding request button, or by means of a corresponding API of the service provider, which allows non-human (devices, apps) access to the service provider's services (e.g. via HTTP). In response to receiving the request, the service provider generates a request token and transmits it to the third party device for authorization by the user.

According to a further embodiment, the request for a request token comprises a device ID corresponding to the third party device.

By including a unique device ID of the third party device in the request, the service provider can generate a request token which can only be used by the requesting third party device. More specifically, when generating an access token at a later stage of the process, the service provider can verify the identity of the third party device and thereby assure that only the requesting third party device obtains access to the user's data.

According to a further embodiment, the request for a request token comprises a user ID corresponding to the user account.

By including a unique user ID corresponding to the user account to which access is requested by the third party device, the service provider can generate a request token corresponding to the specific user account.

According to a further embodiment, the step of obtaining an access token comprises (a) generating, at the third party device, a request for an access token based on the authorized request token, (b) transmitting the request for an access token from the third party device to the service provider, (c) generating, at the service provider, an access token in response to the request for an access token, and (d) transmitting the generated access token from the service provider to the third party device.

The third party device, which is in possession of the authorized request token, generates a request for the access token that provides access to the desired data. More specifically, the request may contain the authorized request token together with data indicating that an access token is requested by the third party device. The generated request is transmitted to the service provider through the network connection, e.g. by means of HTTP. The service provider verifies the request, in particular that the authorization by the user has been validly performed, and, if successful, generates and transmits a corresponding access token to the third party device.

According to a further embodiment, the step of authorizing the request token at the user device comprises (a) logging in to the user account, and (b) signing the request token with a user specific key in order to authorize the request token.

The user device is in network communication with the service provider, e.g. through the Internet. The user accesses the website of the service provider and logs in by submitting his user ID and password. Alternatively, the user may have an app on the user device that is already logged in. Then, the user provides the request token (e.g. by uploading it to the service provider) and indicates that the corresponding access is authorized which prompts the service provider to sign the request token with a specific key such that the user's authorization can be verified later on by applying a corresponding verification key to the signed request token. Also the authorization may be performed directly at the website of the service provider (i.e. by using a browser on the user device) or the abovementioned app may be used to handle the authorization request (using a user interface optimized for the user device).

According to a further embodiment, the step of authorizing the request token at the user device further comprises selecting a set of user data stored at the service provider for authorization.

The selected set of user data may be the entire data corresponding to the user account or it may be a subset thereof. Thereby, during the authorization, the user is able to select exactly which data are to be accessed from the third party device. Data representative of the selection, e.g. file and/or folder names, may be added to the request token such that they form part of the authorized request token. Alternatively, the data representative of the selection may be stored at the service provider.

According to a further embodiment, the step of authorizing the request token at the user device further comprises specifying a validity period for the authorization.

By specifying a validity period for the authorization, the user may assure that the third party device will only be able to access the data for a limited period of time, such as during two hours following the authorization. Data representative of the selection may be added to the request token such that they form part of the authorized request token. Alternatively, the data representative of the selection may be stored at the service provider.

According to a further embodiment, the request token is an OAuth request token and the access token is an OAuth access token.

OAuth is an open standard for authorization. OAuth provides a method for clients to access server resources on behalf of a resource owner (such as a different client or an end-user). It also provides a process for end-users to authorize third-party access to their server resources without sharing their credentials (typically, a username and password pair), using user-agent redirections. OAuth is supported by a plurality of major web service providers, such as Google, Microsoft, PayPal, Amazon, Twitter, Dropbox, Yahoo!, and LinkedIn.

By using the OAuth protocol, the present invention may be implemented in a particularly simple manner by exchanging OAuth tokens between the third party device and the user device through the NFC interface.

According to a further embodiment, the method further comprises accessing the data at the service provider corresponding to the user account by opening a URL containing the access token.

The access token is encoded into the URL such that the third party device may access the user's data by opening the URL in a browser. Alternatively, the third party device may access the user's data by opening the URL in a dedicated application provided by the service provider and installed on the third party device.

According to a second aspect, there is provided a system comprising (a) a service provider, (b) an NFC enabled user device belonging to a user having a user account at the service provider, and (c) an NFC enabled third party device, the third party device and the user device being in network communication with the service provider, wherein the third party device is adapted to obtain a request token issued by the service provider, and transmit the request token to the user device via NFC, wherein the user device is adapted to authorize the request token, and transmit the authorized request token to the third party device via NFC, wherein the service provider is adapted to generate an access token corresponding to the authorized request token, wherein the third party device is further adapted to obtain the access token generated by the service provider, and wherein the third party device is further adapted to, based on the access token, access data associated with the user account at the service provider.

The second aspect is essentially based on the same idea as the first aspect described above. That is, the authorization process is handed over to the user device via NFC, such that there is no need to input user credentials at the third party device (consumer). Accordingly, the privacy of the user credentials is maintained.

The service provider may e.g. be a web service running at a dedicated web server (hardware and/or software).

The user device may e.g. a mobile phone, a smart phone, a personal digital assistant, a tablet computer or a personal computer. In any case, the user device is NFC enabled, capable of accessing the internet, e.g. through Wi-Fi or mobile data network communications (3G, 4G, LTE), and capable of running a browser application.

The third party device may e.g. be an NFC enabled smart television, set-top box, gaming console, tablet computer or personal computer.

It should be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present invention will be apparent from the examples of embodiment to be described hereinafter and are explained with reference to the examples of embodiment. The invention will be described in more detail hereinafter with reference to examples of embodiment to which the invention is, however, not limited.

BRIEF DESCRIPTION OF THE DRAWING

FIG. 1 shows a flowchart illustrating a method of authorizing a third party device to access data associated with a user account at a service provider in accordance with an embodiment.

DETAILED DESCRIPTION

The illustration in the drawing is schematic.

FIG. 1 shows a flowchart illustrating a method of authorizing a third party device (consumer) to access data associated with a user account at a service provider in accordance with an embodiment. More specifically, FIG. 1 shows a sequence of steps involving communication between three entities: a consumer in the left-hand column (also referred to as a third party device), a user device in the middle column (also referred to as user), and a service provider in the right-hand column. The third party device is NFC enabled and connected to the Internet. The user device is an NFC enabled mobile device with Internet access (such as 3G or LTE). The service provider is a webserver allowing registered users, such as the owner of the user device, to store and access data in a secure manner via the Internet.

The method begins at 1 where the third party device (consumer) desires to access data from the user's account at the service provider and therefore transmits a request for an OAuth request token to the service provider via http as indicated by the stipulated arrow 2. The request comprises the following data (in accordance with the OAuth 2.0 Authorization Protocol): oauth_consumer_key, oauth_signature_method, oauth_signature, oauth_timestamp, oauth_nonce, and (optionally) oauth_version. Furthermore, the request may comprise data indicating a user ID of the account which the consumer desires to access.

The service provider receives the request for the request token, grants the request token at 3 and transmits its response including the granted request token to the third party device via http as indicated by the stipulated arrow 4. More specifically, the response 4 comprises the following OAuth data: oauth_token and oauth_token_secret.

The request token is received at the third party device which then, at 5, prompts the user to position the user device in the vicinity of the third party device in order to enable a transfer of the request token from the third party device to the user device via NFC. Once the user device is positioned accordingly, the request token is transmitted to the user device via NFC as indicated by the arrow 6.

The method continues at 7 where the user device accesses the website of the service provider via http as indicated by arrow 8. The user logs into his account by providing his credentials, selects the relevant data from his account as well as a period of validity, and authorizes the access at 9. The service provider signs the request token at 10 and transmits the signed request token to the user device as indicated by arrow 11. Upon receiving the signed request token, at 12 the user once again positions the user device within range of the third party device and transfers the signed request token to the third party device via NFC as indicated by arrow 13.

Then, at 14, the third party device generates a corresponding request for an OAuth access token and transmits it to the service provider via http as indicated by the stipulated arrow 15. The service provider verifies the request at 16 and grants a corresponding access token which is then transmitted to the third party device via http as indicated by the stipulated arrow 17.

Finally, at 18, the third party device can use the access token to access the data selected by the user during the period of validity. That is, the third party device may use the access token as a URL to the selected data during the period of validity.

As can be understood from the above, the present method allows a user to give a third party device access to a selection of personal data at his user account at the service provider without disclosing his user account credentials to the owner of the third party device. Instead, the user uses his own device to receive a request token from the third party device via NFC and to return a corresponding signed (or authorized) request token to the third party device via NFC after performing the authorization process in concert with the service provider. The third party then uses the signed request token to obtain an access token that allows direct access to the selection of data authorized by the user.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also elements described in association with different embodiments may be combined. It should also be noted that reference signs in the claims should not be construed as limiting the scope of the claims.

The invention claimed is:

1. A method of authorizing a third party device to access data associated with a user account at a service provider, wherein the third party device and a separate user device are in data communication with the service provider and are both NFC-enabled, the method comprising:
    obtaining, at the third party device, a request token generated by the service provider, wherein the request token can only be used by a requesting third party device;
    transmitting the request token from the third party device to the separate user device via NFC;
    receiving, at the third party device, a signed request token from the separate user device via NFC, wherein the signed request token was signed by the service provider after user authorization; and
    obtaining, at the third party device via HTTP, an access token generated by the service provider, the access token corresponding to the signed request token, wherein the access token allows the third party device to remotely access a user-defined subset of data associated with the user account at the service provider during a user-defined period of validity.

2. The method according to claim 1, wherein the step of obtaining the request token further comprises:
transmitting a request for the request token from the third party device to the service provider;
receiving a generated request token from the service provider at the third party device.

3. The method according to claim 1, wherein the request for the request token comprises a device ID corresponding to the third party device.

4. The method according to claim 2, wherein the request for the request token comprises a user ID corresponding to the user account.

5. The method according to claim 1, wherein the step of obtaining the access token further comprises:
generating, at the third party device, a request for the access token based on the authorized request token;
transmitting the request for the access token from the third party device to the service provider; and
receiving, at the third party device, a generated access token from the service provider.

6. The method according to claim 1, wherein the signed request token is signed with a user specific key.

7. The method according to claim 1, further comprising:
selecting a set of user data stored at the service provider for authorization.

8. The method according to claim 7, wherein the selected set of user data correspond to the user account.

9. The method according to claim 1, wherein the request token is an OAuth request token and wherein the access token is an OAuth access token.

10. The method according to claim 1, wherein the access token is encoded into a Uniform Resource Locator (URL).

11. The method according to claim 10, further comprising:
opening, with the NFC enabled third party device, the URL in a browser.

12. The method according to claim 10, further comprising:
opening, with the NFC enabled third party device, the URL in a dedicated application.

13. The method according to claim 12, wherein the dedicated application is installed on the NFC enabled third party device.

14. A system comprising:
a service provider;
an NFC enabled user device belonging to a user having a user account at the service provider; and
an NFC enabled third party device, the third party device and the NFC enabled user device being in network communication with the service provider, wherein the NFC enabled third party device is configured to obtain a request token issued by the service provider, the request token can only be used by a requesting third party device, and transmit the request token to the NFC enabled user device via NFC, obtain an access token generated by the service provider based upon a signed request token via HTTP, wherein the signed request token was signed by the service provider after user authorization and based on the access token, remotely access a user-defined subset of data associated with the user account at the service provider during a user-defined period of validity.

* * * * *